United States Patent
Itou et al.

(10) Patent No.: US 10,762,391 B2
(45) Date of Patent: Sep. 1, 2020

(54) LEARNING DEVICE, LEARNING METHOD, AND STORAGE MEDIUM

(71) Applicants: Kabushiki Kaisha Toshiba, Minato-ku (JP); Toshiba Digital Solutions Corporation, Kawasaki-shi (JP)

(72) Inventors: Hidemasa Itou, Inagi (JP); Shinichi Kashimoto, Chuo (JP); Yuuji Irimoto, Fussa (JP)

(73) Assignees: Kabushiki Kaisha Toshiba, Minato-ku (JP); Toshiba Digital Solutions Corporation, Kawasaki-shi (JP)

( * ) Notice: Subject to any disclaimer, the term of this patent is extended or adjusted under 35 U.S.C. 154(b) by 177 days.

(21) Appl. No.: 16/121,358

(22) Filed: Sep. 4, 2018

(65) Prior Publication Data

US 2019/0073567 A1    Mar. 7, 2019

(30) Foreign Application Priority Data

Sep. 6, 2017   (JP) ................................ 2017-171578

(51) Int. Cl.
  *G06K 9/62* (2006.01)
  *G06N 3/04* (2006.01)
  *G06N 3/08* (2006.01)

(52) U.S. Cl.
  CPC ......... *G06K 9/6262* (2013.01); *G06K 9/6256* (2013.01); *G06K 9/6267* (2013.01); *G06N 3/0454* (2013.01); *G06N 3/0472* (2013.01); *G06N 3/0481* (2013.01); *G06N 3/08* (2013.01)

(58) Field of Classification Search
  None
  See application file for complete search history.

(56) References Cited

U.S. PATENT DOCUMENTS

| | | | | |
|---|---|---|---|---|
| 10,284,583 | B2* | 5/2019 | Kasahara | H04L 63/1425 |
| 2015/0332126 | A1 | 11/2015 | Hikida | |
| 2019/0293462 | A1* | 9/2019 | Choi | G01D 3/08 |
| 2020/0050846 | A1* | 2/2020 | Sharma | G06N 3/08 |

FOREIGN PATENT DOCUMENTS

JP     2016-33806     3/2016

* cited by examiner

*Primary Examiner* — Iman K Kholdebarin
(74) *Attorney, Agent, or Firm* — Oblon, McClelland, Maier & Neustadt, L.L.P.

(57) ABSTRACT

According to one embodiment, a learning device includes an acquirer, a generator, a first identifier, an extractor, a second identifier, and a learning-processor. The acquirer acquires real data. The generator generates pseudo data of the real data using a first neural network. The first identifier identifies whether input data is the real data or the pseudo data. The extractor extracts features of data from the input data. The second identifier identifies whether the features extracted by the extractor are features of the real data or features of the pseudo data. The learning-processor learns the first neural network such that the pseudo data and the real data are not discriminated on the basis of an identification result of each identifier.

10 Claims, 11 Drawing Sheets

LEARNING DEVICE, LEARNING METHOD, AND STORAGE MEDIUM

CROSS-REFERENCE TO RELATED APPLICATIONS

This application is based upon and claims the benefit of priority from Japanese Patent Application No. 2017-171578, filed Sep. 6, 2017, the entire content of which are incorporated herein by reference.

FIELD

Embodiments described herein relate generally to learning device, learning method, and storage medium.

BACKGROUND

Conventionally, a technology for classifying desired data such as image data into certain determined categories according to machine learning is known. In such a conventional technology, it is necessary to generate an identifier (learning model) of machine learning in advance in order to classify data and a large amount of learning data is required in order to improve learning accuracy of machine learning. However, in the conventional technology, it is difficult to collect a large amount of learning data in some cases and there is a problem in that learning accuracy of machine learning cannot be sufficiently improved.

BRIEF DESCRIPTION OF THE DRAWINGS

FIG. 11 is a diagram showing an example of generated image data sorted and displayed in order of distances from an identification boundary.

FIG. 12 is a diagram schematically showing a state of range designation selection of generated image data.

DETAILED DESCRIPTION

According to one embodiment, a learning device includes an acquirer (an acquisition unit), a generator (a generation unit), a first identifier (a first identification unit), an extractor (an extraction unit), a second identifier (a second identification unit), and a learning-processor (a learning processing unit). The acquirer acquires real data. The generator generates pseudo data of the same type as the real data using a first neural network. The first identifier identifies whether input data which is the real data or the pseudo data is the real data acquired by the acquirer or the pseudo data generated by the generator. The extractor extracts features of data from the input data. The second identifier identifies whether the features extracted by the extractor are features of the real data acquired by the acquirer or features of the pseudo data generated by the generator. The learning-processor learns the first neural network such that the pseudo data and the real data are not distinguished by the first identifier and the second identifier on the basis of identification results of the first identifier and the second identifier.

Hereinafter, a learning device, a learning method and a storage medium of embodiments will be described with reference to the drawings. The learning device in embodiments automatically generates data (hereinafter referred to as pseudo data) of the same type as real data prepared as learning data of machine learning which is similar to the real data. For example, "the same type as real data" means that, if the real data is image data, pseudo data is also image data and, if the real data is sound data, the pseudo data is also sound data.

Further, the learning device provides human knowledge about pseudo data and real data to both the pseudo data and the real data and causes a classifier to learn the relationship between the data and information given as human knowledge. In addition, the learning device classifies unknown data for which human knowledge has not been provided as a predetermined group (or a cluster, a class or the like) using the learnt classifier and provides information indicating the classification result to a user. In the following embodiment, an example in which real data is image data will be described.

First Embodiment

Figure 1:
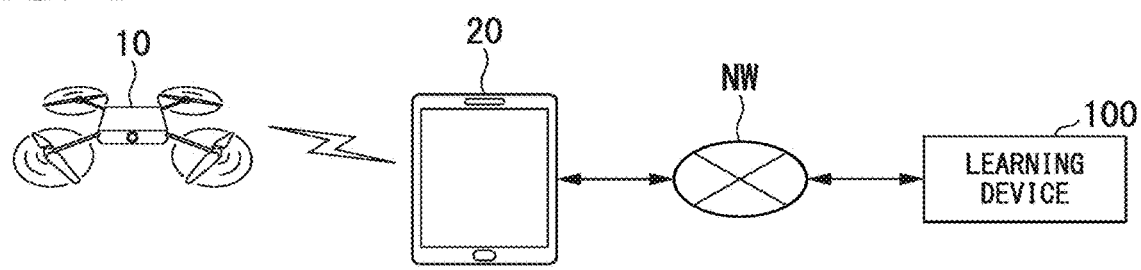
FIG. 1 is a diagram showing an example of the overall configuration of a learning system including a learning device in a first embodiment.

FIG. 1 is a diagram showing an example of the overall configuration of a learning system 1 including a learning device 100 in a first embodiment. For example, the learning system 1 includes one or more drones (unmanned aircraft) 10 which fly through remote control or autonomously, a terminal device 20, and the learning device 100. These devices communicate through a communication network NW. For example, the communication network NW includes wireless base stations, Wi-Fi access points, communication lines, providers, the Internet and the like.

For example, the drone 10 flies around transmission lines and photographs the transmission lines using a camera (not shown). In addition, the drone 10 transmits data of an image captured by the camera to the learning device 100 through the communication network NW. Hereinafter, data of an image captured by the camera will be described as real image data $IMG_R$.

For example, the terminal device 20 is a device operated by an operator who repairs and checks transmission lines. For example, the terminal device 20 is a tablet terminal or a cellular phone such as a smartphone. For example, the terminal device 20 controls flight of the drone 10, causes the camera of the drone 10 to start photographing or causes the drone 10 to transmit real image data $IMG_R$ when a predetermined operation is received from the operator. When the real image data $IMG_R$ is received from the drone 10, the terminal device 20 transmits the real image data $IMG_R$ to the learning device 100.

The learning device 100 causes a classifier 300 to learn the real image data $IMG_R$ transmitted from the terminal device 20 as learning data. Such learning will be described in detail later.

Figure 2:
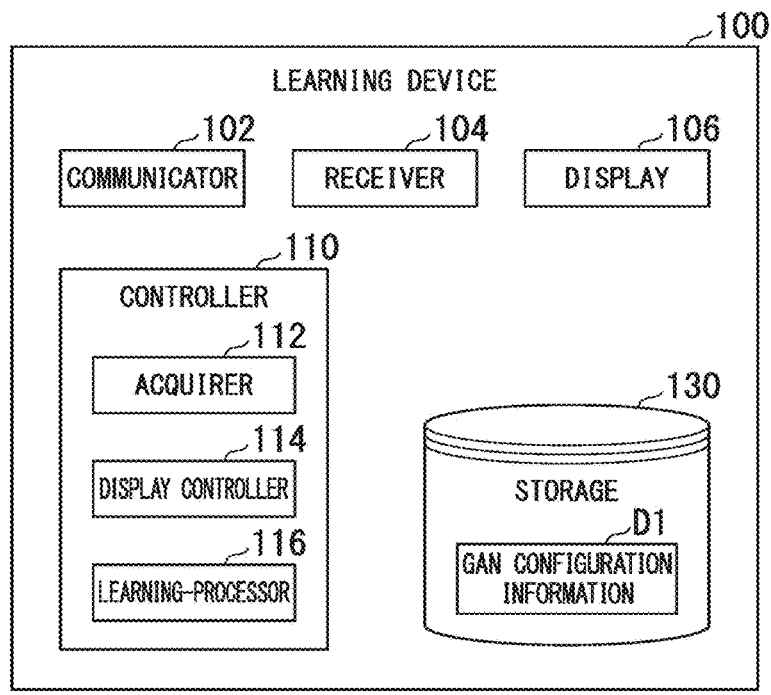
FIG. 2 is a diagram showing an example of a configuration of the learning device in the first embodiment.

FIG. 2 is a diagram showing an example of a configuration of the learning device 100 in the first embodiment. For example, the learning device 100 of the first embodiment includes a communicator (a communication unit) 102, a receiver (a receiving unit) 104, a display 106, a controller 110 and a storage 130.

For example, the communicator 102 includes a communication interface such as a network interface card (NIC), and the like. The communicator 102 communicates with the drone 10 through the communication network NW and receives real image data $IMG_R$ from the drone 10.

The receiver 104 is an input interface, such as a touch panel, a keyboard or a mouse, which receives an operation input by a user. The display 106 is a display device such as a liquid crystal display.

The controller 110 includes an acquirer 112, a display controller 114 and a learning-processor 116, for example. These components are realized by a processor such as a central processing unit (CPU) executing programs stored in the storage 130. In addition, some or all of the components of the controller 110 may be realized by hardware such as a large-scale integration (LSI), an application-specific integrated circuit (ASIC), a field-programmable gate array (FPGA) or a graphics-processing unit (GPU) or realized by software and hardware in cooperation. For example, the programs may be stored in advance in a storage device (non-transient storage medium) such as a hard disk drive (HDD) and a flash memory of the storage 130 or may be stored in a detachable storage medium such as a DVD or a CD-ROM and installed in the storage device by mounting the storage medium in a drive device of the learning device 100.

The storage 130 is realized by an HDD, a flash memory, an electrically erasable programmable read-only memory (EEPROM), a read-only memory (ROM), a random-access memory (RAM) or the like, for example. The storage 130 stores generative adversarial network (GAN) configuration information D1 and the like in addition to various programs such as firmware and application programs. The GAN configuration information D1 is information including types, configurations and learnt parameters of various models such as a generator and an identifier which constitute a GAN. For example, each model is realized by a neural network NN. The GAN configuration information D1 includes combination information representing how neurons (units) included in an input layer, one or more hidden layers (intermediate layers) and an output layer constituting the neural network NN of each model are combined, weight information representing the number of combination coefficients assigned to data input and output between combined neurons, and the like. For example, the combination information includes information such as information indicating the number of neurons included in each layer and the type of neuron which is a combination destination of each neuron, an activation function which realizes each neuron, and a gate provided between neurons of a hidden layer. For example, the activation function which realizes a neuron may be a normalized linear function (ReLU function) or other functions such as a sigmoid function, a step function or a hyperbolic tangent function. For example, the gate selectively passes or weights data transferred between neurons according to a value (e.g., 1 or 0) returned through the activation function. A combination coefficient is a parameter of the activation function and includes weights assigned to output data when the data is output from neurons of a certain layer to neurons of a deeper layer in hidden layers of the neural network NN, for example. Further, the combination coefficient may include a bias component inherent to each layer.

The acquirer 112 acquires real image data $IMG_R$ from the communicator 102 when the communicator 102 has received the real image data $IMG_R$ and causes the storage 130 to store the real image data $IMG_R$.

The display controller 114 causes the display 106 to display the real image data $IMG_R$ acquired by the acquirer 112 as an image. In addition, when generated image data $IMG_I$ similar to the image data $IMG_R$ is generated by the learning-processor 116 which will be described later, the display controller 114 causes the display 106 to display this data as an image.

The learning-processor 116 generates (constructs) a network 200 which is an expanded generative adversarial network with reference to the GAN configuration information D1 stored in advance in the storage 130 and automatically generates generated image data $IMG_I$ treated as learning data using the network 200. In addition, the learning-processor 116 generates a classifier 300 which classifies certain input data in any group among one or more groups on the basis of the real image data $IMG_R$ acquired by the acquirer 112 and the generated image data $IMG_I$ which has been automatically generated. For example, the classifier 300 may be realized by the aforementioned neural network NN or may be realized by a support vector machine (SVM) or the like. Hereinafter, the classifier 300 will be described as a binary classifier which classifies input data as any of a positive instance which is a first group and a negative instance which is a second group. For example, a group which is a positive instance may be treated as a group in which a transmission line has no abnormality and a group which is a negative instance may be treated as a group in which a transmission line has an abnormality.

Figure 3:
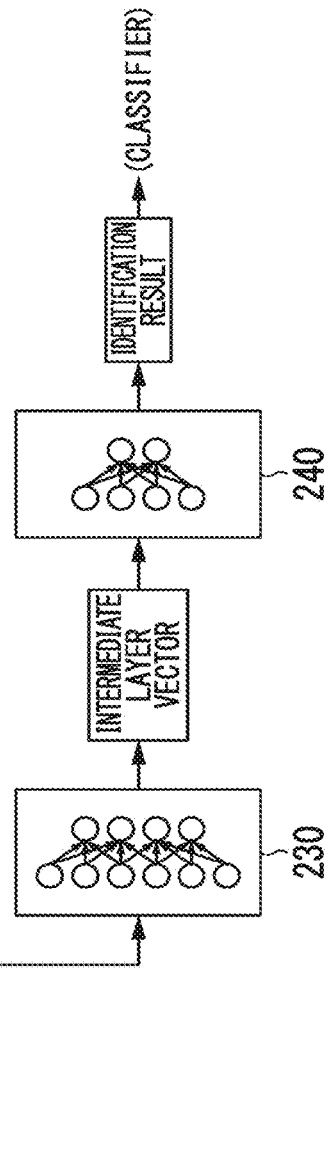
FIG. 3 is a diagram showing an example of a configuration of a network.

FIG. 3 is a diagram showing an example of a configuration of the network 200. For example, the network 200 of the present embodiment is composed of a generator 210, a first identifier 220, a feature extractor 230 and a second identifier 240. The generator 210 is an example of a "generator," the first identifier 220 is an example of a "first identifier," the feature extractor 230 is an example of an "extractor" and the second identifier 240 is an example of a "second identifier."

The generator 210 outputs generated image data $IMG_I$ when a certain type of random number is input. For example, the random number is a uniform random number called a latent variable. The generated image data $IMG_I$ generated by the generator 210 and real image data $IMG_R$ acquired by the acquirer 112 are input to the first identifier 220 and the feature extractor 230.

When certain image data is input, the first identifier 220 identifies the image data as the generated image data $IMG_I$ generated by the generator 210 or the real image data $IMG_R$ acquired by the acquirer 112. More specifically, the first identifier 220 derives a likelihood (first likelihood hereinafter) of the input image data being the real image data $IMG_R$ and identifies the image data as the real image data $IMG_R$ or the generated image data $IMG_I$ according to the first likelihood. The first likelihood is an example of a "first score."

When certain image data is input, the feature extractor 230 extracts a feature from the image data. The feature extracted by the feature extractor 230 is input to the second identifier 240.

The second identifier 240 identifies the feature extracted by the feature extractor 230 as a feature extracted from the real image data $IMG_R$ or a feature extracted from the generated image data $IMG_I$. More specifically, the second identifier 240 derives a likelihood (second likelihood hereinafter) of the feature of the input image data being the feature of the real image data $IMG_R$ and identifies the feature of the image data as the feature of the real image data $IMG_R$ or the feature of the generated image data $IMG_I$ according to the second likelihood. The second likelihood is an example of a "second score."

Each model (apparatus) constituting the network 200 may be realized by the neural network NN, for example. The neural network NN realizing each model is composed of an input layer, one or more intermediate layers (hidden layers) and an output layer, for example. Data desired to be learnt by the neural network NN is input to the input layer. A result learnt by the neural network NN is output from the output layer. The hidden layer performs a process which is a kernel of learning. For example, the hidden layer is represented by a function called an activation function (transfer function) and returns an output in response to an input. For example, although the activation function is a normalized linear function (ReLU function), a sigmoid function, a step function or the like, the present invention is not limited thereto and any function may be used.

For example, the number of units of the input layer constituting the neural network NN (hereinafter referred to as a first neural network NN) of the generator 210 is set to the same value as the number of numerical values which may be acquired as uniform random numbers. For example, when 100 different numerical values are input to the input layer of the first neural network NN as uniform random numbers in a numerical value range from a certain lower limit value to a certain upper limit value, that is, when 100-dimensional numerical values are input to the input layer, the number of units of the input layer is set to 100. Uniform random numbers (latent variables) are input to the input layer of the first neural network NN, converted into features of an image in an intermediate layer and further converted into image data from the features of the image. Then, the image data converted in the intermediate layer is output from the output layer as generated image data $IMG_I$.

For example, the number of units of the input layer constituting the neural network NN (hereinafter referred to as a second neural network NN) of the first identifier 220 is set to the same value as the number of units of the output layer of the first neural network NN. Image data is input to the input layer of the second neural network NN and converted into a first likelihood in an intermediate layer. Then, the first likelihood of the input image data with respect to real image data $IMG_R$ is output from a unit of one side of the output layer and the first likelihood of the input image data with respect to the generated image data $IMG_I$ is output from a unit of the other side.

For example, the number of units of the input layer constituting the neural network NN (hereinafter referred to as a third neural network NN) of the feature extractor 230 is set to the same value as the number of units of the output layer of the first neural network NN. In addition, the number of units of the output layer of the third neural network NN is set to the same number as the number of units of any (preferably, an intermediate layer disposed between the input layer and the output layer) of one or more intermediate layers constituting the first neural network NN. Image data is input to the input layer of the third neural network NN and converted into a feature of an image. In addition, the feature of the image is output from each unit of the output layer. Since the number of units of the output layer of the third neural network NN is set to the same value as the number of units of any intermediate layer of the first neural network NN, the feature extractor 230 extracts a feature of an image obtained through a procedure in which the generator 210 generates image data from uniform random numbers. Hereinafter, a feature of an image will be described as an intermediate layer vector.

For example, the number of units of the input layer of the neural network NN (hereinafter referred to as a fourth neural network NN) of the second identifier 240 is set to the same value as the number of units of the output layer of the third neural network NN. An intermediate layer vector (a feature of an image) is input to the input layer of the fourth neural network NN and converted into a second likelihood. Then, the second likelihood of the input intermediate layer vector with respect to features of real image data $IMG_R$ is output from a unit of one side of the output layer and the second likelihood of the input intermediate layer vector with respect to features of generated image data $IMG_I$ is output from a unit of the other side.

The learning-processor 116 learns the generator 210 such that generated image data $IMG_I$ and real image data $IMG_R$ are not discriminated by the first identifier 220 having a certain identification accuracy or higher and features extracted from the generated image data $IMG_I$ and features extracted from the real image data $IMG_R$ are not discriminated by the second identifier 240 having a certain identification accuracy or higher. "Leaning the generator 210" means determination of parameters of an intermediate layer constituting the neural network NN of the generator 210, for example. The parameters include a weight component multiplied to data when the data is transmitted from an input layer to an output layer, and a bias component added thereto. Whenever data is transmitted from a layer which is an intermediate layer to another layer, a weight component and a bias component are applied to the data and an activation function of an intermediate layer of a transmission destination is multiplied by the data.

Meanwhile, although a model (model determining parameters) which is a learning target of the network 200 is the generator 210 herein, the present invention is not limited thereto and some or all of the first identifier 220, the feature extractor 230 and the second identifier 240 may be models which are learning targets.

Hereinafter, processing of the learning-processor 116 when generated image data $IMG_I$ is generated will be described using a plurality of flowcharts.

Figure 4:
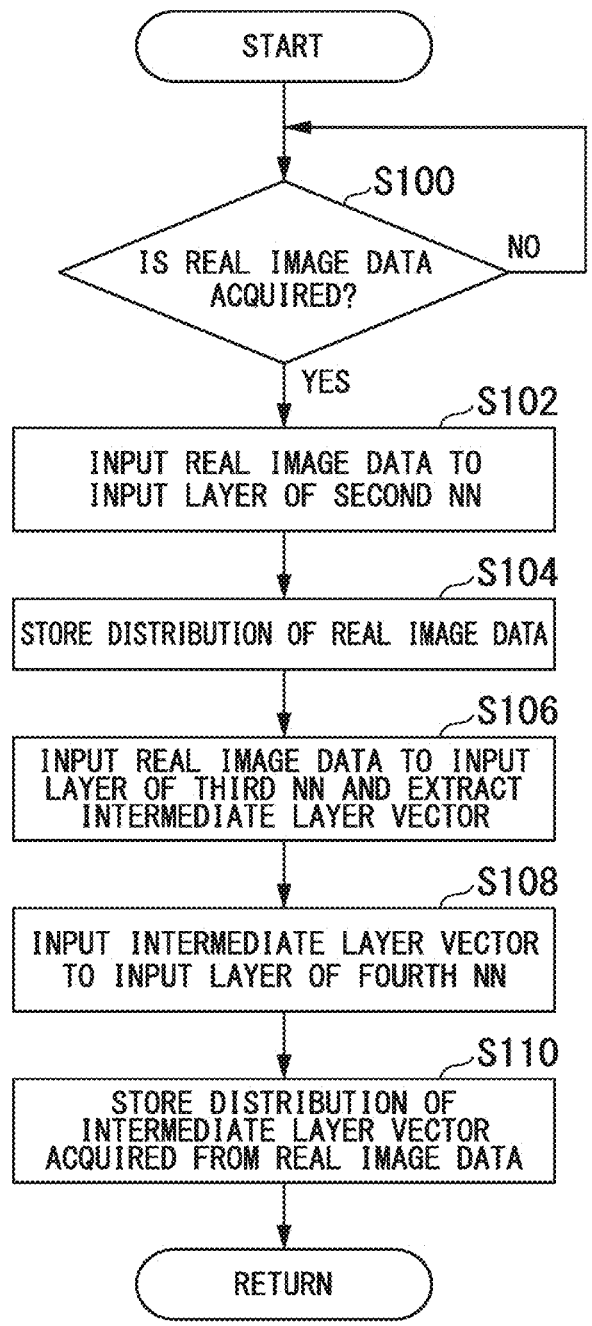
FIG. 4 is a flowchart showing an example of a process performed by a learning-processor.

FIG. 4 is a flowchart showing an example of a process performed by the learning-processor 116. The process of this flowchart represents processing performed in advance before the generator 210 is learnt, for example.

First, the learning-processor 116 waits until the acquirer 112 acquires real image data $IMG_R$ (step S100) and inputs the real image data $IMG_I$ to the input layer of the second neural network NN when the acquirer 112 acquires the real image data $IMG_R$ (step S102).

Subsequently, the learning-processor 116 stores a distribution of the real image data $IMG_R$ output from the output layer of the second neural network NN in the storage 130 (step S104). Here, "distribution" means a distribution of image data in a certain real space.

Then, the learning-processor 116 inputs the real image data $IMG_R$ to the input layer of the third neural network NN and extracts an intermediate layer vector of the same type as an intermediate layer vector output from the intermediate layer of the first neural network NN from the real image data $IMG_R$ (step S106).

Next, the learning-processor 116 inputs the intermediate layer vector extracted from the real image data $IMG_R$ to the input layer of the fourth neural network NN using the third neural network NN (step S108).

Thereafter, the learning-processor 116 stores a distribution of the intermediate layer vector output from the output layer of the fourth neural network NN in the storage 130 (step S110). Here, "distribution" means a distribution of the intermediate layer vector in a certain feature space. With this, the process of the flowchart ends.

Figure 5:
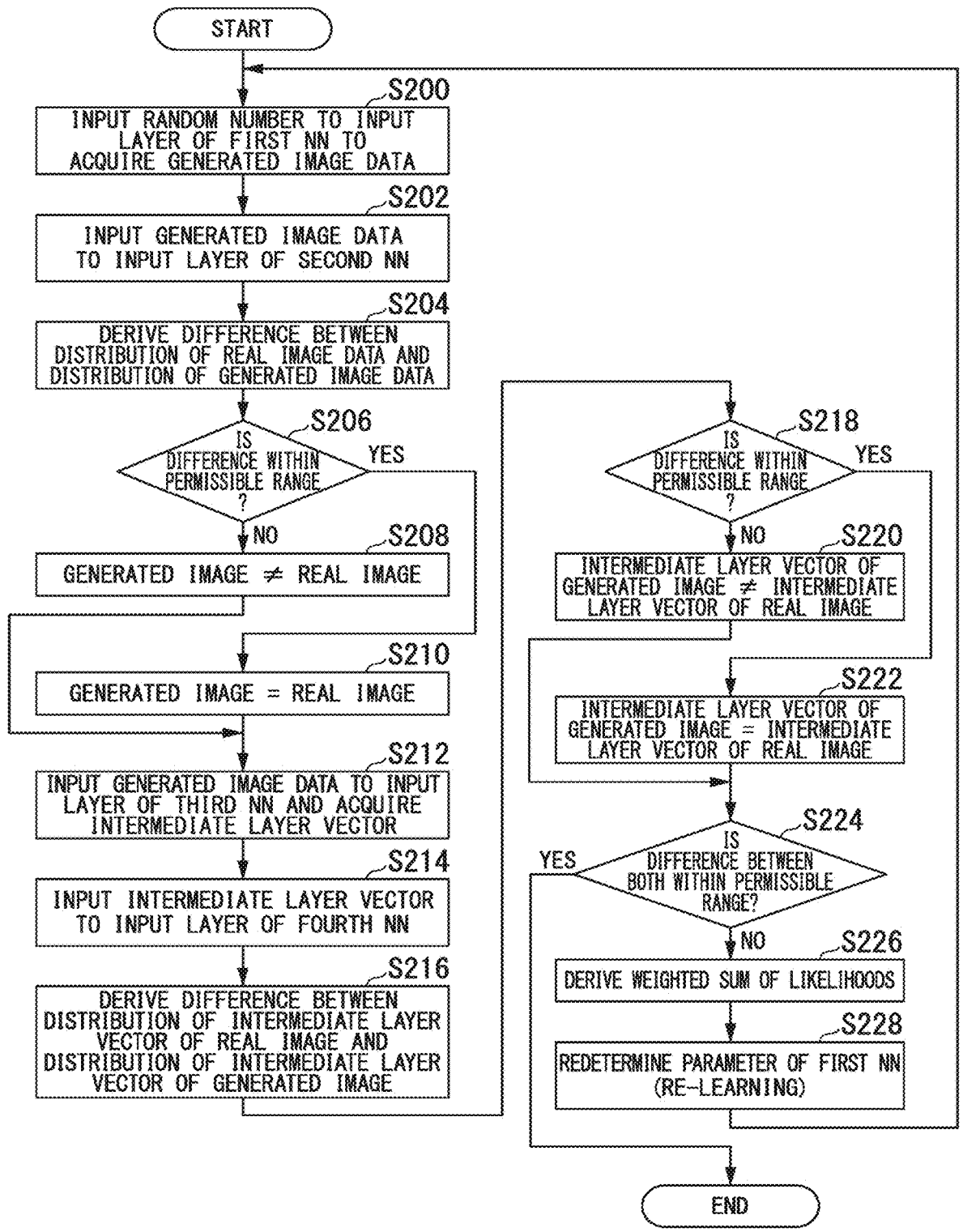
FIG. 5 is a flowchart showing another example of a process performed by a learning-processor.

FIG. 5 is a flowchart showing another example of the process performed by the learning-processor 116. For example, the process of this flowchart represents processing of causing the generator 210 to generate generated image data $IMG_I$ and learning the generator 210 on the basis of an identification result of each identifier with respect to the generated image data $IMG_I$.

First, the learning-processor 116 inputs uniform random numbers to the input layer of the first neural network NN and acquires generated image data $IMG_I$ from the output layer of the first neural network NN (step S200).

Then, the learning-processor 116 inputs the generated image data $IMG_I$ acquired using the first neural network NN to the input layer of the second neural network NN (step S202).

Subsequently, the learning-processor 116 derives a difference (e.g., a variance difference, deviation or the like) between a distribution of the real image data $IMG_R$ stored in the storage 130 and a distribution of the generated image data $IMG_I$ obtained from the output layer of the second neural network NN (step S204).

Then, the learning-processor 116 determines whether the derived difference is within a permissible range (step S206), determines that the generated image data $IMG_I$ is not the real image data $IMG_R$ if the difference is outside the permissible range (step S208) and determines that the generated image data $IMG_I$ is the real image data $IMG_R$ if the difference is within the permissible range (step S210).

Thereafter, the learning-processor 116 inputs the generated image data $IMG_I$ to the input layer of the third neural network NN and acquires an intermediate layer vector from the intermediate layer of the third neural network NN (S212).

Next, the learning-processor 116 inputs the intermediate layer vector acquired using the third neural network NN to the input layer of the fourth neural network NN (step S214).

Subsequently, the learning-processor 116 derives a difference between a distribution of an intermediate layer vector of the real image data $IMG_R$ stored in the storage 130 and a distribution of the intermediate layer vector of the generated image data $IMG_I$ acquired from the output layer of the fourth neural network NN (step S216).

Thereafter, the learning-processor 116 determines whether the derived difference is within a permissible range (step S218), determines that the intermediate layer vector extracted from the generated image data $IMG_I$ is not the intermediate layer vector extracted from the real image data $IMG_R$ if the difference is outside the permissible range (step S220) and determines that the intermediate layer vector extracted from the generated image data $IMG_I$ is the intermediate layer vector extracted from the real image data $IMG_R$ if the difference is within the permissible range (step S222).

Subsequently, the learning-processor 116 determines whether both the derived differences are within the permissible ranges (step S224), and when both the differences are outside the permissible ranges, derives a weighted sum of a first likelihood derived when the generated image data $IMG_I$ output by the first neural network N has been input to the second neural network NN and a second likelihood derived when the intermediate layer vector of the generated image data $IMG_I$ extracted by the third neural network NN has been input to the fourth neural network NN (step S226).

Thereafter, the learning-processor 116 redetermines parameters of the first neural network NN using an error backward propagation method on the basis of the derived weighted sum (step S228). Then, the learning-processor 116 returns the process to step S200.

On the other hand, when both the differences are within the permissible ranges, the learning-processor 116 ends the process of this flowchart.

A general generative adversarial network is composed of the generator 210 and the first identifier 220 in the present embodiment. In this case, the first identifier 220 is learnt such that generated image data $IMG_I$ and real image data $IMG_R$ are discriminated from each other and the generator 210 is learnt such that the first identifier 220 identifies the generated image data $IMG_I$ as the real image data $IMG_R$. This corresponds to minimization of the distribution of the real image data $IMG_R$ and the distribution of the generated image data $IMG_I$ through a specific distance measure. However, when the generator 210 is only learnt to deceive the first identifier 220, a considerable error may be generated in the distributions of both of the generated image data and the real image data in a feature space. For example, even if the generated image data $IMG_I$ and the real image data $IMG_I$ are determined to be the same image data when they are seen with the human eyes, when features of these images are compared in the feature space, they may be different features.

On the other hand, the learning-processor 116 using the network 200 which is an extended generative adversarial network makes the distribution of the generated image data $IMG_I$ close to the distribution of the real image data $IMG_R$ in the real space and, simultaneously, imposes restrictions such that the distribution of the intermediate layer vector of the generated image data $IMG_I$ is not too far apart from the distribution of the intermediate layer vector of the real image data $IMG_R$ in the feature space, and then learns the generator 210 as in the above-described process of the flowchart. Accordingly, it is possible to cause the network 200 as well as the human eyes to have difficulty in identifying the generated image data $IMG_I$ and the real image data $IMG_R$. As a result, it is possible to generate generated image data $IMG_I$ more similar to the real image data $IMG_R$. In other words, not only is the generated image data $IMG_I$ output from the output layer of the first neural network NN brought close to the real image data $IMG_R$ but also features of the generated image data $IMG_I$ output from the intermediate layer of the first neural network NN are brought close to features of the real image data $IMG_R$, and thus it is possible to make finally acquired generated image data $IMG_I$ be more similar to the real image data $IMG_R$.

The learning-processor 116 generates a plurality of pieces of generated image data $IMG_I$ using the learnt generator 210 when the generated image data $IMG_I$ is identified as the real image data $IMG_R$ in both the real space and the feature space, that is, when the generated image data $IMG_I$ has been generated with accuracy of a degree to which each identifier is sufficiently deceived as a result of learning. Then, the learning-processor 116 learns the classifier 300 on the basis of the generated plurality of pieces of generated image data $IMG_I$ and the real image data $IMG_R$ acquired by the acquirer 112.

Figure 6:
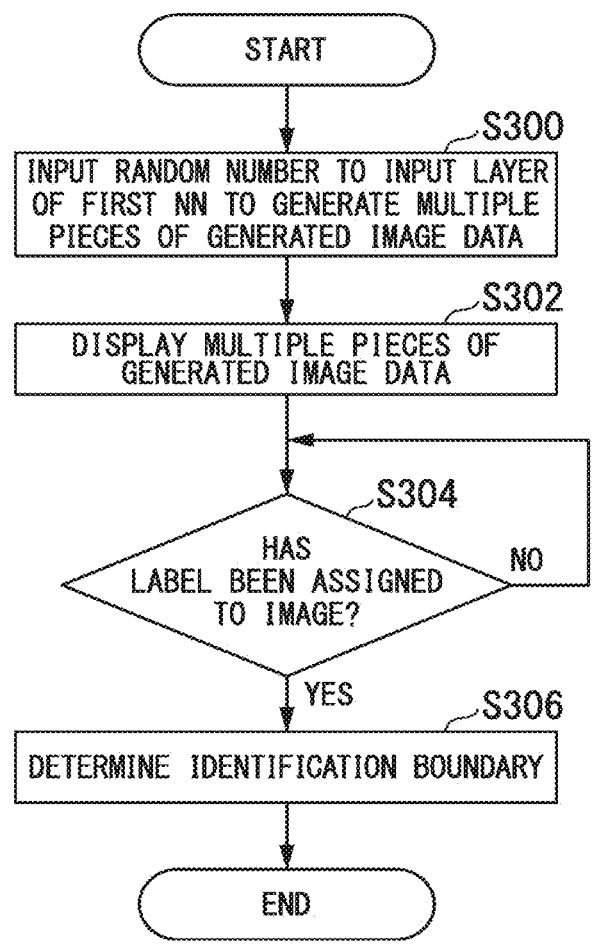
FIG. 6 is a flowchart showing an example of a learning process of a classifier performed by a controller.

FIG. 6 is a flowchart showing an example of a learning process of the classifier 300 performed by the controller 110. First, the learning-processor 116 inputs a random number to each unit of the input layer of the first neural network NN to generate a plurality of pieces of generated image data $IMG_I$ (step S300).

Subsequently, the display controller 114 causes the display 106 to display the plurality of pieces of generated image data $IMG_I$ (step S302).

Thereafter, the learning-processor 116 waits until the receiver 104 receives a user operation of assigning information (hereinafter referred to as label information) indicating any of a positive instance and a negative instance to the plurality of pieces of generated image data $IMG_I$ displayed as an image on the display 106 (step S304) and, when the user operation of assigning label information to each piece of generated image data $IMG_I$ is received, the learning-processor determines an identification boundary for classifying input data as a positive instance or a negative instance on the basis of the plurality of pieces of generated image data $IMG_I$ and real image data $IMG_R$ acquired by the acquirer 112 (step S306). The label information is data representing a correct answer into which data input to the classifier 300 will be classified.

Figure 7A:
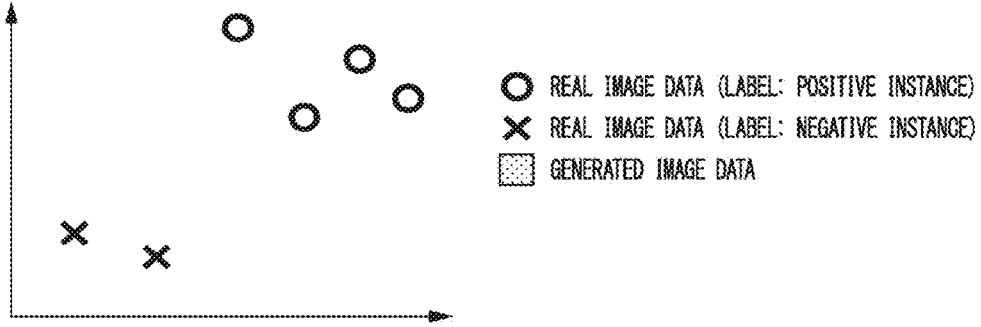
FIG. 7A is a diagram schematically showing an identification boundary determination method.
Figure 7B:
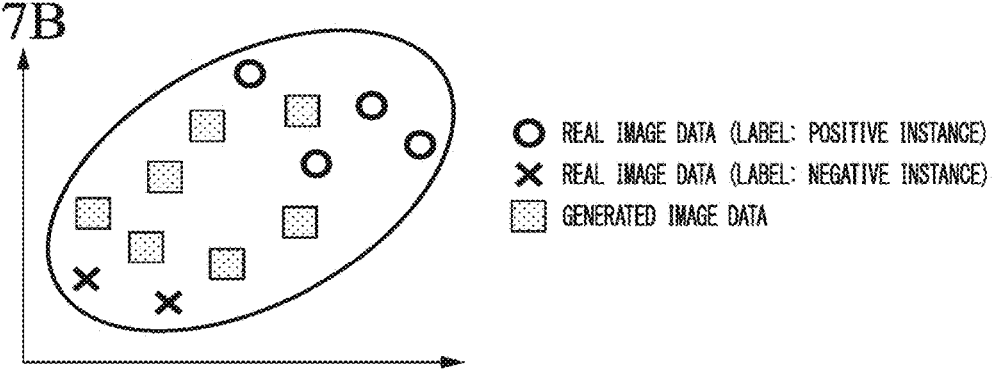
FIG. 7B is a diagram schematically showing an identification boundary determination method.
Figure 7C:
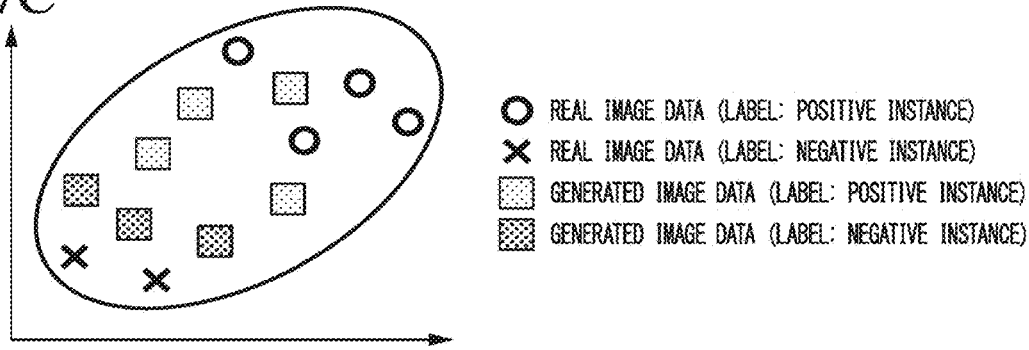
FIG. 7C is a diagram schematically showing an identification boundary determination method.
Figure 7D:
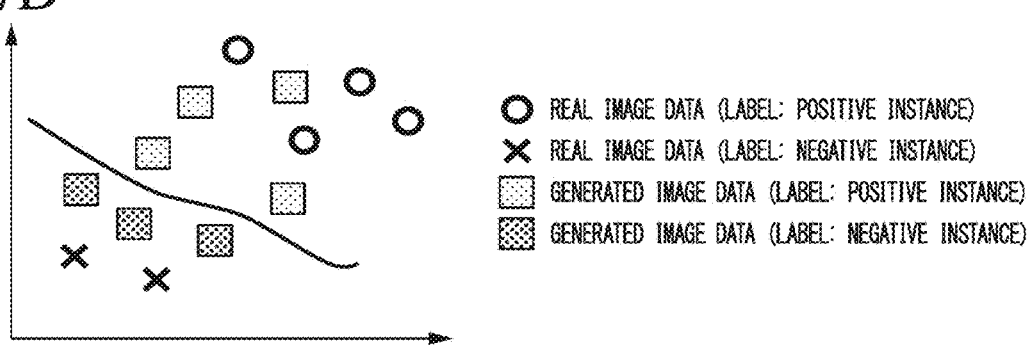
FIG. 7D is a diagram schematically showing an identification boundary determination method.

FIGS. 7A to 7D are diagrams schematically showing an identification boundary determination method. In FIG. 7A, generated image data $IMG_I$ has not been generated yet and only real image data $IMG_R$ has been distributed in a certain real space. It is assumed that label information has been assigned to the real image data $IMG_R$ in advance. In such a case, when the number of pieces of real image data $IMG_R$ is small, it is difficult to determine an identification boundary for appropriately identifying a positive instance and a negative instance. Accordingly, the learning-processor 116 generates a plurality of pieces of interpolated generated image data $IMG_I$ which satisfy the space in which the real image data $IMG_R$ is distributed, as shown in FIG. 7B. Then, the learning-processor 116 causes the user to assign label information of a positive instance or a negative instance to the plurality of pieces of generated image data $IMG_I$, as shown in FIG. 7C. Thereafter, the learning-processor 116 determines an identification boundary on the basis of the real image data $IMG_R$ to which label information has already been assigned and the generated image data $IMG_I$ assigned label information by the user, as shown in FIG. 7D. By generating a large amount of generated image data $IMG_I$ very similar to the real image data $IMG_R$ in this manner, the identification boundary becomes clearer in the space in which the real image data $IMG_R$ is distributed and thus it is possible to determine whether data is a positive instance or a negative instance with high accuracy when the data is newly input to the classifier 300.

Figure 8:
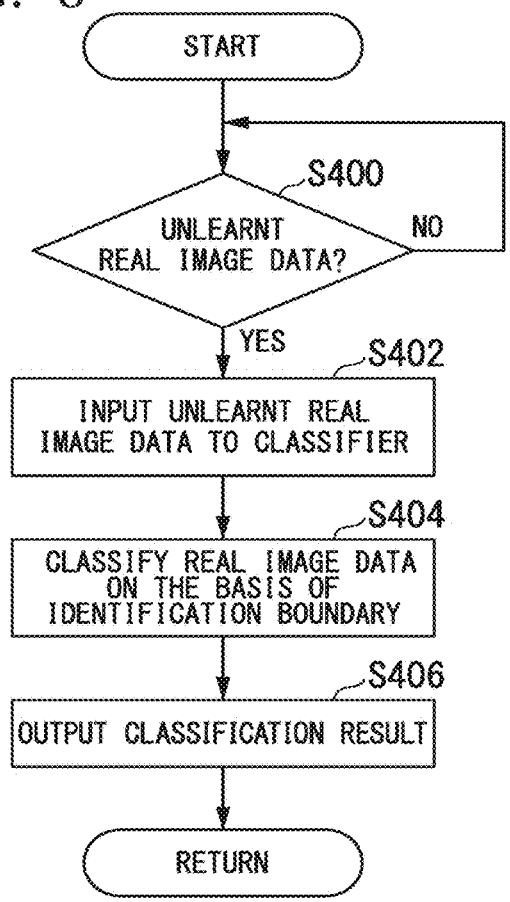
FIG. 8 is a flowchart showing an example of a classification process performed by a learnt classifier.

FIG. 8 is a flowchart showing an example of a classification process performed by the learnt classifier 300. First, when the acquirer 112 acquires real image data $IMG_I$, the learning-processor 116 determines whether the real image data $IMG_R$ is unlearnt real image data $IMG_R$ (step S400). For example, "unlearnt" represents that a right answer which is a classification result has not been given as label information as human knowledge and data has not been used in determination of the identification boundary of the classifier 300.

Subsequently, the learning-processor 116 inputs the unlearnt real image data $IMG_R$ to the learnt classifier 300 (step S402). Then, the learning-processor 116 classifies the unlearnt real image data $IMG_R$ as a positive instance or a negative instance on the basis of the identification boundary (step S404).

Thereafter, the display controller 114 displays the classification result of the unlearnt real image data $IMG_R$ on the display 106 as an image (step S406). Meanwhile, the controller 110 may transmit the classification result of the unlearnt real image data $IMG_R$ to a server device, a terminal device of the user, and the like using the communicator 102. Hereby, the process of this flowchart ends.

Figure 9:
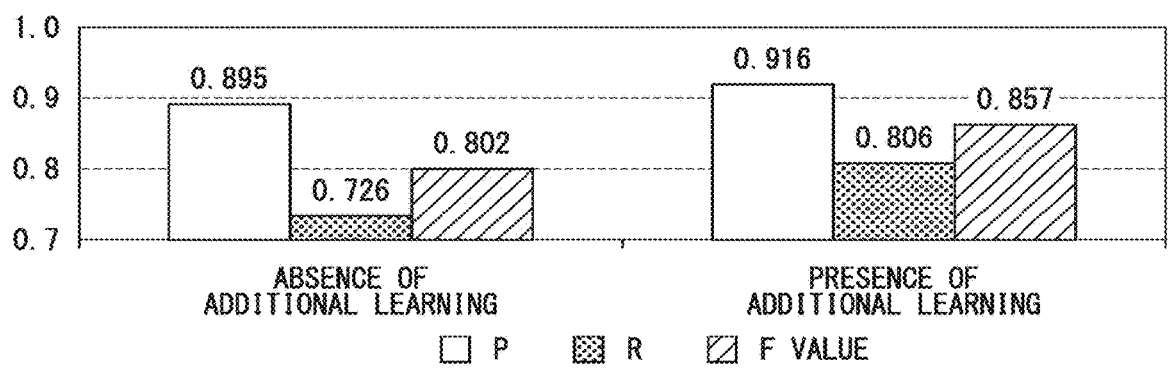
FIG. 9 is a diagram showing an example of a verification result of a learning method in the first embodiment.

FIG. 9 is a diagram showing an example of a verification result of a learning method in the first embodiment. "Absence of additional learning" in the figure represents various evaluation index values when the classifier 300 has been learnt having only real image data $IMG_R$ as learning data without including generated image data $IMG_I$ in the learning data. In addition, "presence of additional learning" represents various evaluation index values when the classifier 300 is learnt having both the generated image data $IMG_I$ and the real image data $IMG_R$ as learning data.

For verification, precision P representing smallness of recognition error, reproducibility R representing smallness of recognition omission, and F value (=2PR/(P+R)) which is a harmonic mean of the precision P and the reproducibility R are used as evaluation indexes. A larger F value represents a higher recognition accuracy of the classifier 300. As shown in FIG. 9, all of the precision P, reproducibility R and F value are higher in the case of presence of additional learning to result in improvement or recognition accuracy than in the case of absence of additional learning.

According to the first embodiment, it is possible to automatically generate a plurality of pieces of generated image data $IMG_I$ as learning data necessary for machine learning and improve learning accuracy by including the acquirer 112 which acquires real image data $IMG_R$ as real data, the generator 210 which generates generated image data $IMG_I$ that is pseudo data of the same type as the real image data $IMG_R$ using the first neural network NN, the first identifier 220 which identifies whether input data which is real image data $IMG_R$ or generated image data $IMG_I$ is the real image data $IMG_R$ acquired by the acquirer 112 or the generated image data $IMG_I$ generated by the generator 210, the feature extractor 230 which extracts features of data from the input data which is real image data $IMG_R$ or generated image data $IMG_I$ the second identifier 240 which identifies whether the features extracted by the feature extractor 230 are features of the real image data $IMG_R$ acquired by the acquirer 112 or features of the generated image data $IMG_I$ generated by the generator 210, and the learning-processor 116 which learns the first neural network NN such that the generated image data $IMG_I$ and the real image data $IMG_R$ are not discriminated by the first identifier 220 and the second identifier 240 on the basis of the identification results of the first identifier 220 and the second identifier 240.

Modified Example of First Embodiment

Hereinafter, a modified example of the first embodiment will be described. Although real data used as learning data is image data and a plurality of pieces of image data which are the same type as the real data and similar to the real data are automatically generated using the network 200 in the above-described first embodiment, the present invention is not limited thereto. For example, the real data may be sound data recorded through a microphone, text data of sentences read through a scanner and the like. In this case, the learning-processor 116 causes the generator 210 of the network 200 to generate artificial sound data or text data. In addition, the learning-processor 116 imposes limitations such that distributions of data become close in a real space and features extracted from data are not too apart from each other in a feature space and then learns the generator 210. Accordingly, it is possible to automatically generate pseudo data similar to each data irrespective of whether the real data is sound data or text data.

Second Embodiment

Hereinafter, a learning device 100 according to a second embodiment will be described. The leaning device 100 in the second embodiment differs from the first embodiment in that data distributed near an identification boundary is automatically generated using the network 200 in order to improve accuracy of the identification boundary. Accordingly, description will focus on such a difference and description of the same parts will be omitted.

Figure 10:
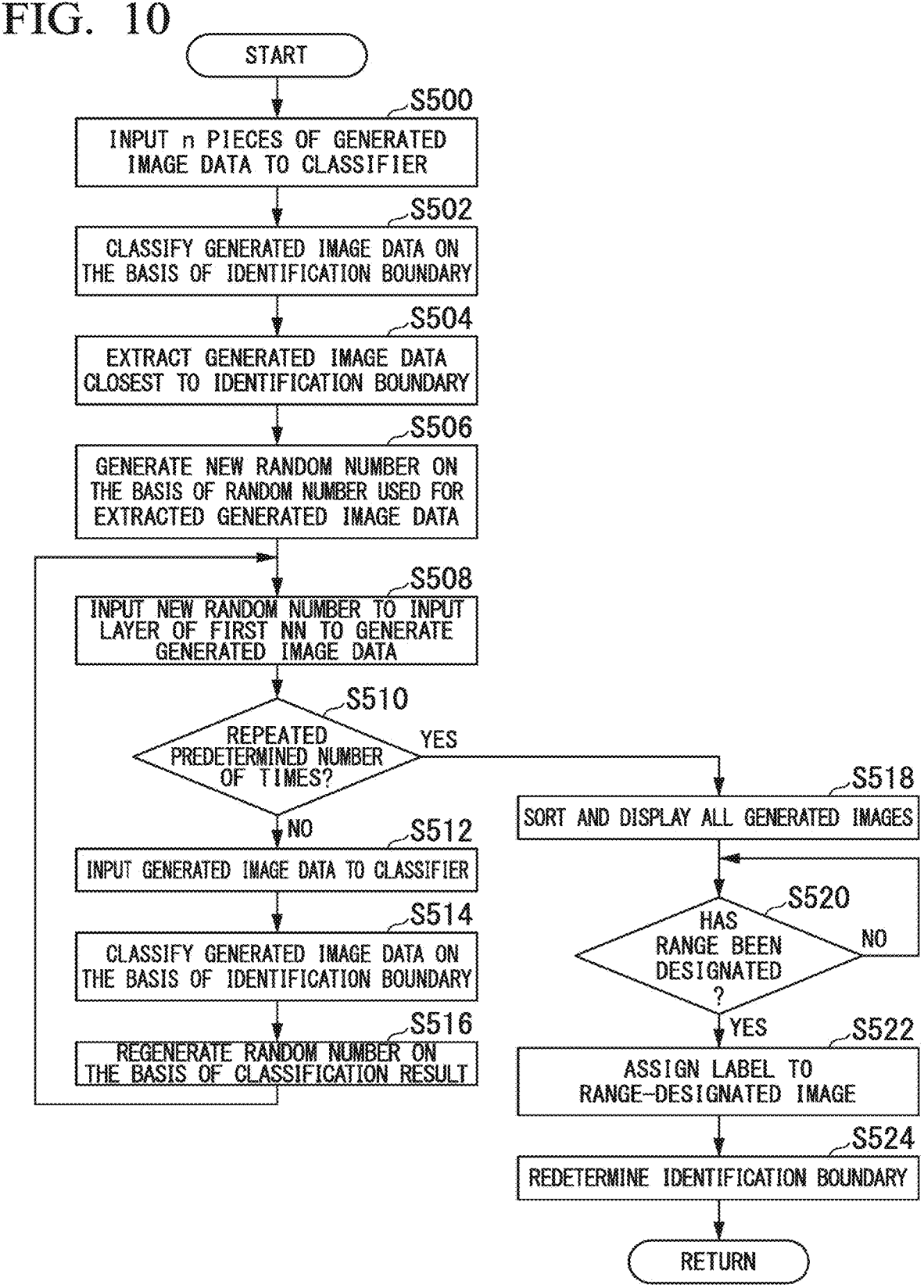
FIG. 10 is a flowchart showing an example of a process of a learning device in a second embodiment.

FIG. 10 is a flowchart showing an example of a process of the learning device 100 in the second embodiment. First, the learning-processor 116 causes the generator 210 of the network 200 to generate n (n is any natural number) pieces of generated image data $IMG_I$ and inputs the generated image data $IMG_I$ to the learnt classifier 300 (step S500). Here, it is assumed that the generator 210 has been sufficiently learnt.

Subsequently, the learning-processor 116 causes the learnt classifier 300 to classify the input generated image data $IMG_I$ as a positive instance or a negative instance on the basis of an identification boundary which has already been determined (step S502).

Then, the learning-processor 116 extracts generated image data $IMG_I$ distributed at a position closest to the identification boundary from the plurality of pieces of generated image data $IMG_I$ classified as a positive instance or a negative instance (step S504). For example, when the generated image data $IMG_I$ is input to the learnt classifier 300, each piece of the input generated image data $IMG_I$ is distributed as a vector representing a feature in a space in which an identification boundary has already been obtained. The learning-processor 116 derives a distance between the vector corresponding to each piece of image data $IMG_I$ and the identification boundary and extracts a vector having a shortest distance from the identification boundary from a plurality of vectors distributed in the space. Image data corresponding to the extracted vector is generated image data $IMG_I$ distributed at the position closest to the identification boundary.

Subsequently, the learning-processor 116 generates new random numbers on the basis of random numbers used when the extracted generated image data $IMG_I$ has been generated (step S506). For example, it is assumed that generated image data $IMG_I$ generated using a random number of "5" is distributed at the position closest to the identification boundary when a plurality of pieces of generated image data $IMG_I$ are generated using values such as 1, 2, 3, . . . as random numbers in a number range for which upper and lower limits have been determined. In this case, the learning-processor 116 uses values in a dimension having a finer pitch, such as "5.1" and "4.9," as new random numbers on the basis of the value "5."

Thereafter, the learning-processor 116 inputs the newly generated random numbers to the input layer of the first neural network NN which is the generator 210 to generate new generated image data $IMG_I$ (step S508).

Then, the learning-processor 116 updates the random numbers and determines whether the process of generating new generated image data $IMG_I$ has been repeated a predetermined number of times (step S510).

When the random numbers are updated and it is determined that the process of generating new generated image data $IMG_I$ has been repeated the predetermined number of times, the learning-processor 116 proceeds to a process of S518 which will be described later.

On the other hand, when the random numbers are updated and it is determined that the process of generating new generated image data $IMG_I$ has not been repeated the predetermined number of times, the learning-processor 116 inputs the newly generated image data $IMG_I$ to the classifier 300 (step S512).

Subsequently, the learning-processor 116 causes the classifier 300 to classify the input generated image data $IMG_1$ as a positive instance or a negative instance on the basis of the identification boundary (step S514).

Thereafter, the learning-processor 116 regenerates random numbers on the basis of the classification result of the classifier 300 (step S516) and returns the process to step S508.

For example, based on a random number (e.g., 5.0) used when the generated image data $IMG_I$ extracted through the process of S504 is generated, if newly generated image data $IMG_I$ is far from the identification boundary when a random number (e.g., 5.1) larger than the base is generated, the learning-processor 116 generates the next random number (e.g., 4.9) smaller than the random number which is the base. In addition, if newly generated image data $IMG_I$ is close to the identification boundary when a random number (e.g., 5.1) larger than the base is generated, the learning-processor 116 further increases the next random number (e.g., 5.2).

When a random number smaller than the random number which is the base has been generated, the learning-processor 116 also increases the next random number if newly generated image data $IMG_I$ is far from the identification boundary and further decreases the next random number when newly generated image data $IMG_I$ is close to the identification boundary.

In this manner, the learning-processor 116 repeatedly searches generated image data $IMG_I$ assumed to be distributed near the identification boundary while changing random numbers.

Then, the display controller 114 sorts a predetermined number of pieces of generated image data $IMG_I$ which have been searched near the identification boundary in order of distances from the identification boundary and causes the display 106 to display the generated image data $IMG_I$ as an image (step S518).

Figures 11, 12:
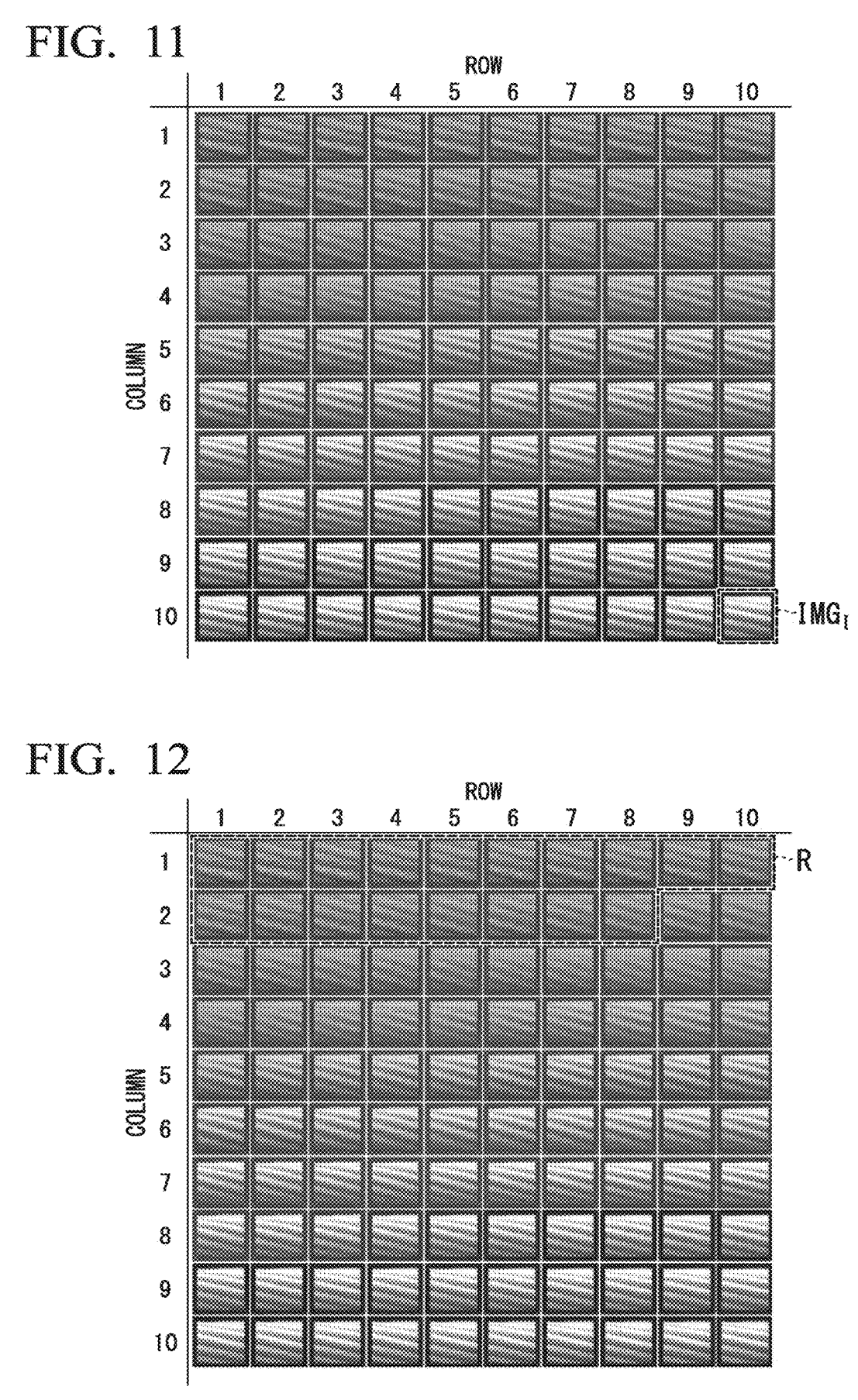

FIG. 11 is a diagram showing an example of generated image data $IMG_I$ sorted and displayed in order of distances from the identification boundary. Each piece of generated image data $IMG_I$ is represented by a matrix (i, j). For example, generated image data $IMG_I$ of (1, 1) represents distribution at a position farthest from the identification boundary in a positive instance side of the real space, and generated image data $IMG_I$ becomes closer to the identification boundary in order of (1, 2), (1, 3), (1, 4), ..., (1, 10), (2, 1), (2, 2), ..., (2, 10), (3, 1), (3, 2), .... Further, generated image data $IMG_I$ of (10, 10) represents distribution at a position farthest from the identification boundary in a negative instance side of the real space, and generated image data $IMG_I$ becomes closer to the identification boundary in order of (10, 9), (10, 8), (10, 7), ..., (10, 1), (9, 10), (9, 9), ..., (9, 1), (8, 10), (8, 9), ....

Subsequently, after the predetermined number of pieces of generated image data $IMG_I$ are sorted and displayed on the display 106, the learning-processor 116 determines whether the receiver 104 has received an operation of selecting generated image data $IMG_I$ regarded as a positive instance or a negative instance from the predetermined number of pieces of generated image data $IMG_I$ according to range designation (step S520) and, when the receiver 104 has received the operation, assigns label information of a group of one side of the positive instance of the negative instance to all generated image data $IMG_I$ selected according to range designation (step S522).

FIG. 12 is a diagram schematically showing a state of range designation selection of generated image data $IMG_I$. For example, when a predetermined number of pieces of generated image data $IMG_I$ are sorted and displayed in order of distances from the identification boundary, the user collectively assigns label information to a plurality of pieces of image data according to range designation such as designation of a range of image data as a positive instance and a range of image data as a negative instance. In the illustrated example, label information which is a positive instance is assigned to generated image data $IMG_I$ of (1, 1) to (2, 8) included in a range R.

Next, the learning-processor 116 collectively assigns the same label information to the range-designated generated image data $IMG_I$ and then redetermines the identification boundary of the classifier 300 using the generated image data $IMG_I$ as learning data (step S524). Accordingly, the process of this flowchart ends.

Figure 13A:
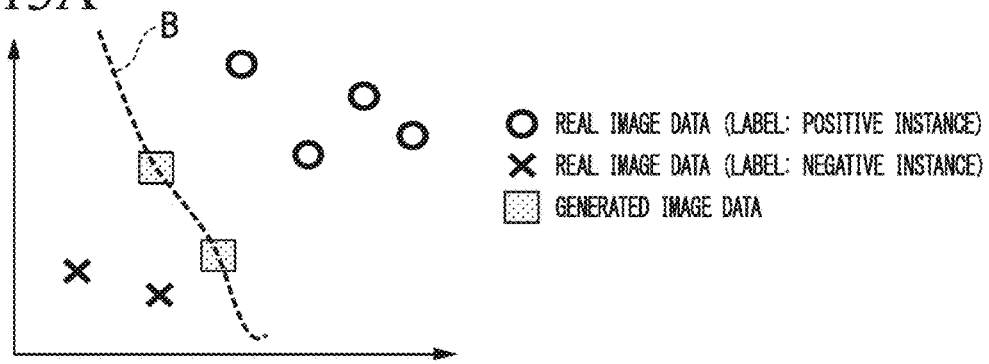
FIG. 13A is a diagram schematically showing a state in which an identification boundary is redetermined.
Figure 13B:
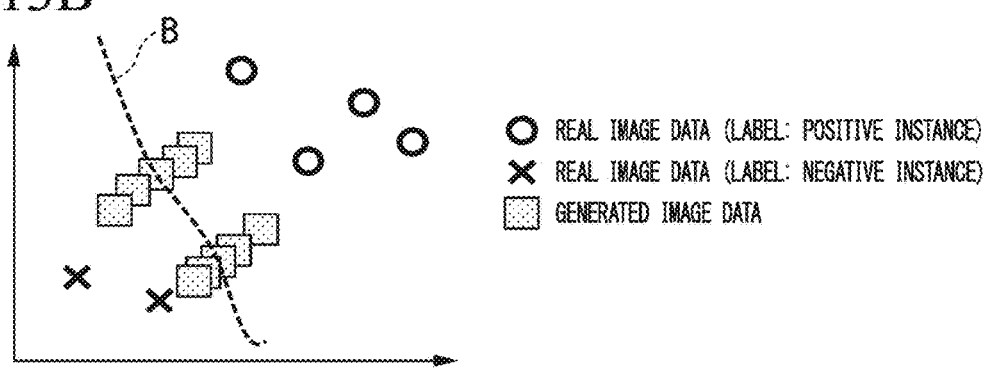
FIG. 13B is a diagram schematically showing a state in which an identification boundary is redetermined.
Figure 13C:
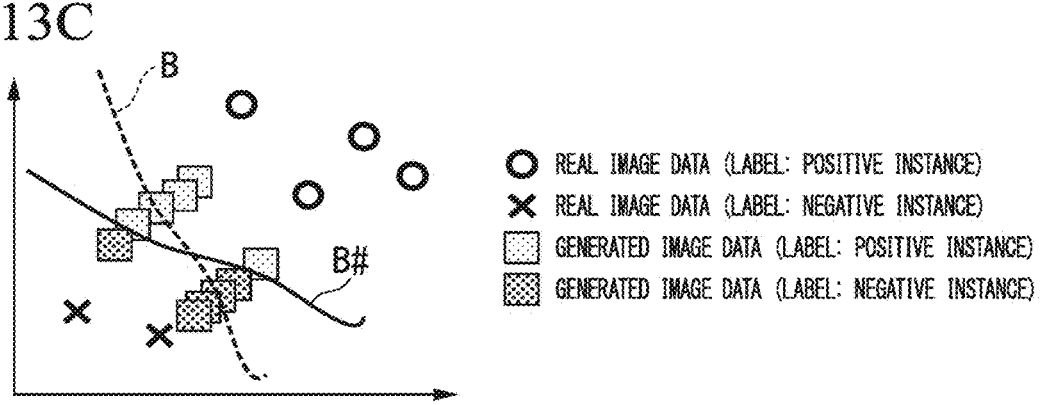
FIG. 13C is a diagram schematically showing a state in which an identification boundary is redetermined.

FIG. 13A to FIG. 13C are diagrams schematically showing a state in which an identification boundary is redetermined. In FIG. 13A, an identification boundary B is determined only using real image data to which label information has been assigned. In such a case, the learning-processor 116 generates n pieces of generated image data $IMG_I$ and extracts generated image data $IMG_I$ closest to the identification boundary B from the n pieces of generated image data $IMG_I$, as described above. In the illustrated example, two pieces of generated image data $IMG_I$ are extracted as generated image data $IMG_I$ closest to the identification boundary B.

When the generated image data $IMG_I$ closest to the identification boundary B is extracted, the learning-processor 116 generates a new random number on the basis of a random number used for this (these) generated image data $IMG_I$ and inputs the random number to the input layer of the first neural network NN to generate new generated image data $IMG_I$. When this process is repeated a predetermined number of times, a predetermined number of pieces of generated image data $IMG_I$ having different distances to the identification boundary B are generated such that they cross the identification boundary B, as shown in FIG. 13B. Since the two pieces of generated image data $IMG_I$ have been extracted as generated image data $IMG_I$ closest to the identification boundary in the example of FIG. 13A, generated image data $IMG_I$ is searched at two positions having the extracted two pieces of generated image data $IMG_I$ as starting points in the example of FIG. 13B.

When the user selects generated image data $IMG_I$ from the predetermined number of pieces of generated image data $IMG_I$ having different distances to the identification boundary B according to range designation, as shown in FIG. 13C, the learning-processor 116 assigns label information to the range-designated generated image data $IMG_I$ and predetermines the identification boundary B of the classifier 300 having the range-designated generated image data $IMG_I$ as learning data. In the figure, B # represents the redetermined identification boundary. Accuracy of the identification boundary can be improved through this process.

According to the second embodiment described above, it is possible to improve accuracy of an identification boundary because a plurality of pieces of generated image data $IMG_I$ distributed near the identification boundary are generated, the user is caused to assign label information which is positive instance data to the generated image data $IMG_I$, and the classifier 300 is re-learnt on the basis of the generated image data $IMG_I$ to which the label information has been assigned. As a result, learning accuracy can be further improved.

In addition, according to the second embodiment, since a plurality of pieces of generated image data $IMG_I$ distributed near the identification boundary are sorted in order of distances from the identification boundary and displayed, the user can easily select data regarded as a positive instance or a negative instance from the plurality of pieces of sorted and displayed generated image data $IMG_I$ according to range designation. In general, when a plurality of pieces of generated image data $IMG_I$ are generated using random numbers which are close, these pieces of generated image data $IMG_I$ are distributed at close positions in a real space. Accordingly, when these pieces of generated image data $IMG_I$ are sorted in order of distances from the identification boundary, image data of the positive instance are grouped and image data of the negative instance are grouped and thus there is no case in which only one piece of image data of the negative instance is present in image data of the positive instance. Consequently, even if the user collectively selects data regarded as the positive instance, for example, erroneous data selection is prevented and selection omission of correct data is reduced and thus accuracy of derivation of an identification boundary can be improved.

(Hardware Configuration)

Figure 14:
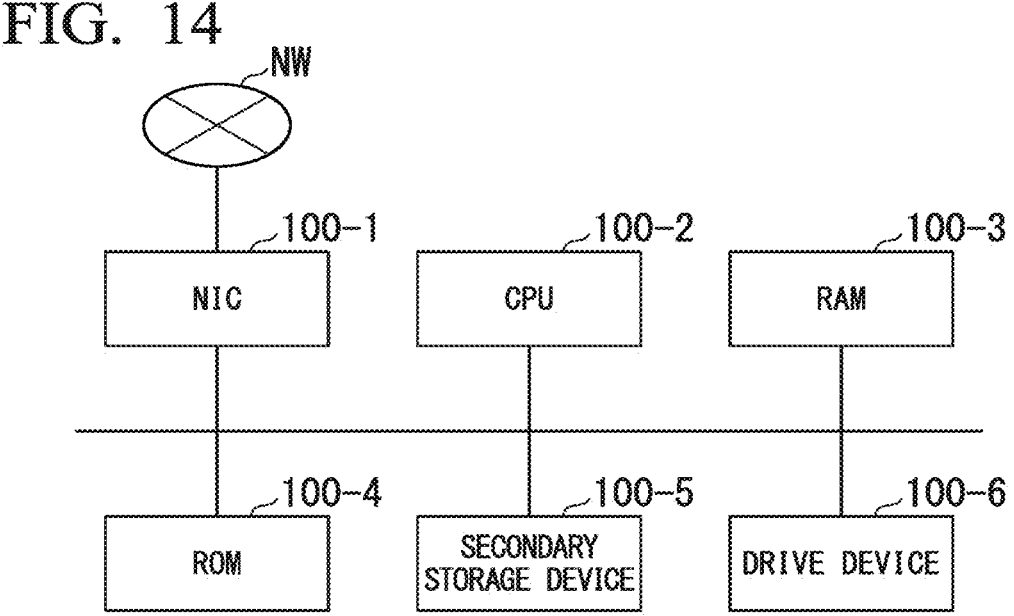
FIG. 14 is a diagram showing an example of a hardware configuration of a learning device of an embodiment.

Among the plurality of devices included in the learning system 1 of the above-described embodiment, at least the learning device 100 is realized by a hardware configuration as shown in FIG. 14, for example. FIG. 14 is a diagram showing an example of a hardware configuration of the learning device 100 of an embodiment.

The learning device 100 has a configuration in which an NIC 100-1, a CPU 100-2, a RAM 100-3, a ROM 100-4, a secondary storage device 100-5 such as a flash memory and an HDD, and a drive device 100-6 are connected through an internal bus or a dedicated communication line. A portable storage medium such as an optical disc is mounted in the drive device 100-6. A program stored in the secondary storage device 100-5 or the portable storage medium mounted in the drive device 100-6 is developed in the RAM 100-3 by a DMA controller (not shown) or the like and executed by the CPU 100-2 to realize the controller 110. The program referred to by the controller 110 may be downloaded from other devices through the communication network NW.

According to at least the one embodiment above-described, it is possible to automatically generate a plurality of pieces of generated image data $IMG_i$ as learning data necessary for machine learning and improve learning accuracy by including the acquirer 112 which acquires real image data $IMG_R$ as real data, the generator 210 which generates generated image data $IMG_i$ that is pseudo data of the same type as the real image data $IMG_R$ using the first neural network NN, the first identifier 220 which identifies whether input data which is real image data $IMG_R$ or generated image data $IMG_i$ is the real image data $IMG_R$ acquired by the acquirer 112 or the generated image data $IMG_i$ generated by the generator 210, the feature extractor 230 which extracts features of data from the input data which is real image data $IMG_R$ or generated image data $IMG_i$, the second identifier 240 which identifies whether the features extracted by the feature extractor 230 are features of the real image data $IMG_R$ acquired by the acquirer 112 or features of the generated image data $IMG_i$ generated by the generator 210, and the learning-processor 116 which learns the first neural network NN such that the generated image data $IMG_i$ and the real image data $IMG_R$ are not discriminated by the first identifier 220 and the second identifier 240 on the basis of the identification results of the first identifier 220 and the second identifier 240.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning device, comprising:
   an acquirer configured to acquire real data;
   a generator configured to generate pseudo data of the same type as the real data using a first neural network;
   a first identifier configured to identify whether input data which is the real data or the pseudo data is the real data acquired by the acquirer or the pseudo data generated by the generator;
   an extractor configured to extract features of data from the input data;
   a second identifier configured to identify whether the features extracted by the extractor are features of the real data acquired by the acquirer or features of the pseudo data generated by the generator; and
   a learning-processor configured to learn the first neural network such that the pseudo data and the real data are not distinguished by the first identifier and the second identifier on the basis of identification results of the first identifier and the second identifier.

2. The learning device according to claim 1, wherein the first identifier derives a first score based on a degree of likelihood of the input data being the real data or the pseudo data, the second identifier derives a second score based on a degree of likelihood of the features extracted by the extractor being the features of the real data or the features of the pseudo data, and the learning-processor learns the first neural network on the basis of the first score derived by the first identifier from certain pseudo data of interest and the second score derived by the second identifier from the pseudo data of interest.

3. The learning device according to claim 1, wherein the extractor extracts features of the input data using a second neural network which is learnt to output features in response to input data.

4. The learning device according to claim 3, wherein an input layer constituting the second neural network has the same configuration as an output layer constituting the first neural network, and an output layer constituting the second neural network has the same configuration as any of one or more intermediate layers constituting the first neural network.

5. The learning device according to claim 1, wherein the learning-processor further generates a classifier which classifies the input data as any of groups including one or more groups on the basis of the real data and the pseudo data.

6. The learning device according to claim 5, wherein the learning-processor causes the generator to generate, as the pseudo data, data classified near a boundary between a plurality of different groups by the classifier.

7. The learning device according to claim 6, further comprising:
   a receiver is configured to receive an operation of a user;
   a display is configured to display an image; and
   a display controller is configured to cause the display to display an image,
   wherein the display controller causes the display to display, as an image, second pseudo data near the boundary among one or more pieces of pseudo data generated by the generator, and the learning-processor causes the classifier to re-learn the boundary on the basis of second pseudo data to which a positive instance of classification of groups has been assigned by the user when the receiver receives an operation of assigning a positive instance of a group to which the second pseudo data will be classified to each of one or more pieces of second pseudo data displayed by the display as an image.

8. The learning device according to claim 7, wherein the display controller sorts images of one or more pieces of second pseudo data near the boundary in order of distances between the second pseudo data and the boundary and causes the display to display the images.

9. A learning method comprising, by a computer:
   acquiring real data;
   generating pseudo data of the same type as the real data using a first neural network;
   performing a first identification process of identifying whether input data which is the real data or the pseudo data is the acquired real data or the generated pseudo data;
   extracting features of data from the input data;
   performing a second identification process of identifying whether the extracted features are features of the acquired real data or features of the generated pseudo data; and
   learning the first neural network such that the pseudo data and the real data are not discriminated by the first identification process and the second identification process on the basis of identification results of the first identification process and the second identification process.

10. A non-transitory computer-readable storage medium storing a program for causing a computer:
- to acquire real data;
- to generate pseudo data of the same type as the real data using a first neural network;
- to perform a first identification process of identifying whether input data which is the real data or the pseudo data is the acquired real data or the generated pseudo data;
- to extract features of data from the input data;
- to perform a second identification process of identifying whether the extracted features are features of the acquired real data or features of the generated pseudo data; and
- to learn the first neural network such that the pseudo data and the real data are not discriminated by the first identification process and the second identification process on the basis of identification results of the first identification process and the second identification process.

* * * * *